United States Patent [19]

Patterson

[11] 4,143,309

[45] Mar. 6, 1979

[54] TURBOMOLECULAR PUMP DRIVE METHOD AND APPARATUS

[76] Inventor: Williams G. Patterson, 3571 South Court, Palo Alto, Calif. 94306

[21] Appl. No.: 786,579

[22] Filed: Apr. 11, 1977

[51] Int. Cl.² ............................................... H02P 5/40
[52] U.S. Cl. ..................................... 318/807; 318/313
[58] Field of Search ............... 318/231, 341, 313, 312, 318/311, 310

[56] References Cited

U.S. PATENT DOCUMENTS

| | | | |
|---|---|---|---|
| 3,644,721 | 2/1972 | Preiser | 318/231 |
| 4,042,862 | 8/1977 | Franklin | 318/231 |

*Primary Examiner*—Herman J. Hohauser
*Attorney, Agent, or Firm*—C. Michael Zimmerman

[57] ABSTRACT

A high vacuum turbomolecular pump is described incorporating a drive system which significantly reduces the amount of heat build-up therein. The pump includes an outer casing having an upper open end adapted to be communicated hermetically with an isolated environment to be pumped, and an exhaust opening at its lower end. A plurality of vertically spaced stator blade wheels are positioned within the casing intermediate the inlet and exhaust openings, and a rotor is mounted within the casing on a spindle for rotation therewith on a generally vertical axis. The rotor is provided with a plurality of axially spaced rotor blade wheels interleaved with the stator blade wheels. An electrical induction motor is incorporated into the pump with its rotor output shaft being the spindle so as to rotate such spindle and, hence, the pump rotor for high vacuum pumping. A photosensor is included for sensing the frequency of rotation of the pump rotor and a slip frequency oscillator is provided to generate a desired constant slip frequency. A control circuit is included for combining the desired slip frequency with the pump rotor frequency of operation in order to drive the stator of the motor with a constant slip frequency.

12 Claims, 2 Drawing Figures

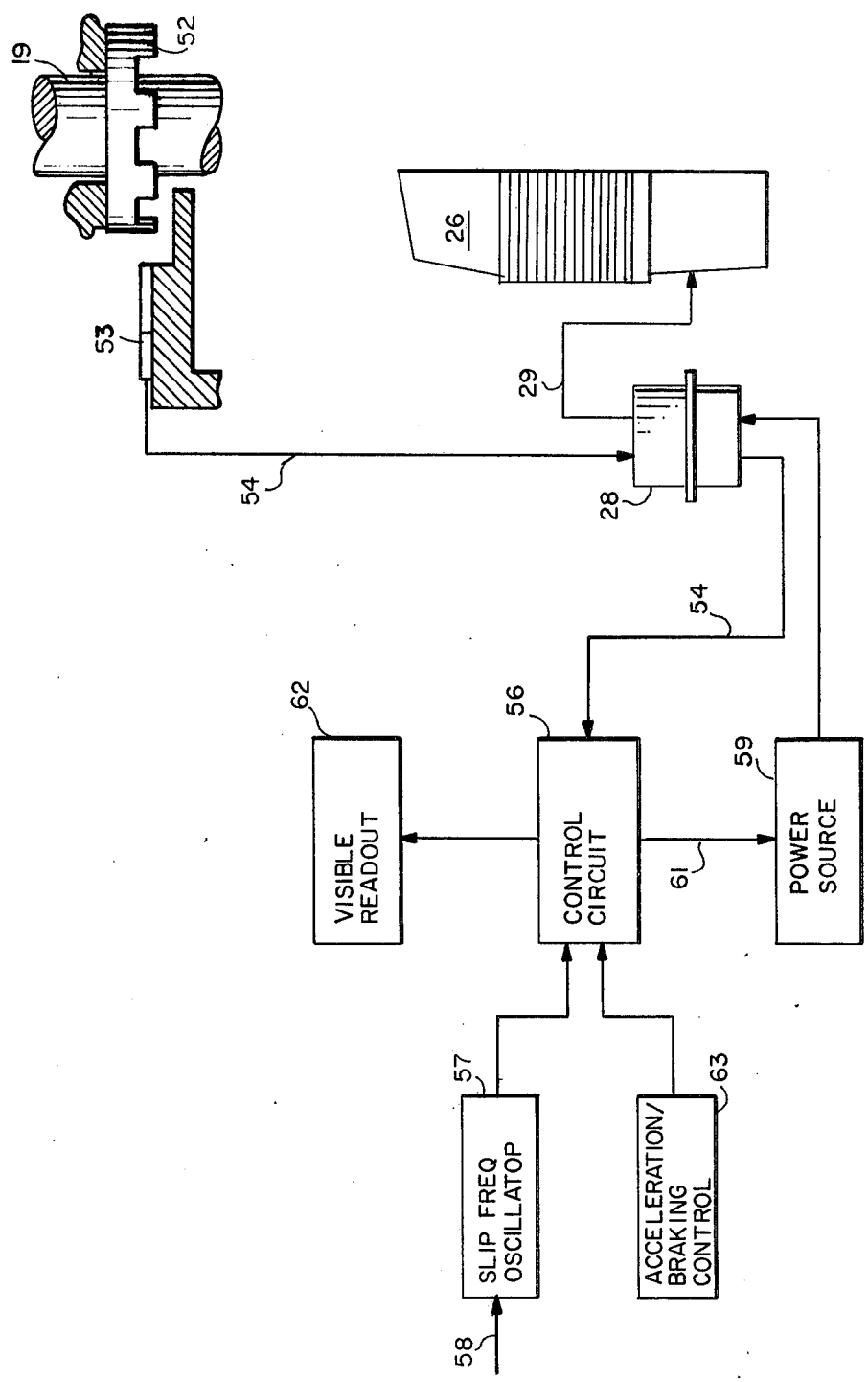

TURBOMOLECULAR PUMP DRIVE METHOD AND APPARATUS

BACKGROUND OF THE INVENTION

The present invention relates to high vacuum turbomolecular pumps and, more particularly, to a turbomolecular pump drive method and apparatus which reduces the temperature of operation of such a pump.

Turbomolecular pumps are increasingly being used to pump in the free molecule pressure range, i.e., $10^{-3}$ to $10^{-10}$ torr, because they are inherently non-contaminating. They operate on kinetic gas principles and rely on the relative motion between gas molecules and an interleaved cascade of stator and rotor blade wheels upon which such molecules impact. The design of the blade wheels makes it more probable that a molecule striking the same will rebound toward the pump outlet then toward its inlet.

In general, the pumping speed and efficiency of a turbomolecular pump is dependent upon the speed of rotation of the rotor blades. For this reason, rotor speeds as high as 50,000 r.p.m. are not unusual. The motor responsible for such high rotational speeds typically is incorporated directly into the pump with the motor rotor output shaft also serving as the axle or, in other words, spindle for the pump rotor.

The pump motor must rotate the large inertia load represented by the pump rotor at the reduced pressures within the pump casing. This results in significant heat build-up in the pump due to electrical inefficiencies in the motor. Such generation of heat can be so severe to limit the operating capabilities of turbomolecular pumps.

The electrically caused, excessive temperatures generated in such a pump, can be eliminated easily in the stationary components of such a motor, by thermal conduction to a heat sink. However, the rotating components can be difficult to cool due to poor heat conduction paths. Because of the vacuum environment, heat removal by convection is practically non-existent and radiation heat transfer can at most amount to just a few percent of the total heat generated.

Synchronous motor drives are chosen by some turbomolecular pump manufacturers in view of the low heat generation which is inherent in a synchronous motor when it operates synchronously. Synchronous motors, however, have other drawbacks. They have comparatively low efficiency, particularly when operated at power loadings less than the full load rating, and centrifugal force loading of the permanent magnetic materials used in synchronous motor rotors limit the same to relatively low rotational speeds. Moreover, occasional malfunction of the controls of such motors can cause the same to operate out of synchronous speeds. Such an asynchronous operation generates large amounts of heat in the motor rotor with resulting damage or destruction.

In view of the above drawbacks, many turbomolecular pump manufacturers have turned to induction-type motor arrangements for their pumps. The stator of such a motor generates a rotating magnetic field at a frequency of rotation proportional to the frequency of alternating current which is applied thereto by a power source. The rotor of such a motor is positioned within the rotating magnetic field to rotate in response thereto. Typically the motor rotor rotates with a frequency of rotation which is less than the frequency of rotation of the rotating magnetic field generated by the stator. The motor output shaft torque is a function of this difference, which difference is called the slip frequency. The amount of heat generated in the rotor of such an induction motor is approximately proportional to the torque output multiplied by this slip frequency.

The stator of an induction motor is maintained stationary, and the heat which is generated by electrical inefficiencies thereat can be easily removed from the pump. It is more difficult to remove the heat generated at the motor rotor. One method of attempting to do so is to utilize the flow of lubricant to the rotor shaft bearings, not only to lubricate such bearings but also to cool the motor rotor. U.S. Pat. No. 3,877,546 describes such a cooling arrangement. There are several significant problems with the same, however. For one, the flow of coolant is dependent on a minimum rotor rotation since centrifugal action is relied on for pumping. In typical operation, large amounts of heat are generated at the rotor during pump start up, i.e., before the motor has reached a sufficient rotational speed to cause centrifugal pumping of the lubricant/coolant. Moreover, there is generally a conduction joint between the motor rotor and shaft or other structure within which the lubricant flows. Such a joint also reduces the efficiency of a lubricant cooling arrangement by being an imperfection in the heat conduction path. This is especially true since the motor is operating at a reduced pressure so that there is no gas or other air to aid heat transfer across imperfections in the joint.

SUMMARY OF THE INVENTION

The present invention is an induction motor driven turbomolecular pump, and a method for operating the same, which alleviates the problems of excessive heat generation by preventing such generation in the first place, rather than attempting to remove the same after it is generated. Thus, not only are the deleterious effects of heat buildup eliminated, but the pump operates more efficiently.

In its basic aspects, the method for reducing the operating temperature of an induction motor driven turbomolecular pump comprises the steps of sensing the frequency of rotation of the pump rotor shaft, providing a signal defining a desired slip frequency, and utilizing the frequency of rotation of the pump rotor shaft and such signal to generate a frequency correction signal for application to the alternating current power source which generates the rotating magnetic field in the motor stator to control the frequency of the alternating current applied to the motor. Control of the slip frequency in this manner enables the amount of heat generated by the motor rotor of the pump to be likewise controlled.

Most desirably, the slip frequency is selected to be constant for both acceleration and steady state operation of the pump rotor. Such constant slip frequency can be added to the frequency of rotation of the rotor for both acceleration and steady state pump operation so that amount of heat generated is not dependent upon the slip frequency variations normally associated with motor acceleration or any significant load variation.

As another aspect of the invention, it provides pump deceleration when desired. That is, the method of the invention can include the step of utilizing the slip frequency to decrease the frequency of alternating current applied to the stator to a value less than the frequency of rotation of the pump rotor. This will cause the motor to brake the pump rotor blades, rather than accelerate or maintain their rotational speed.

The apparatus of the invention includes, in its basic aspects, a turbomolecular pump having as is usual an outer casing having an inlet opening for communication with the environment to be pumped, and an exhaust opening spaced therefrom; and a rotor mounted for rotation with a spindle in the casing, which rotor has a plurality of spaced rotor blade wheels interleaved with stator blade wheels positioned within such casing between its inlet and exhaust openings. An electrical induction motor is incorporated into the pump for rotating the spindle and rotor. Such motor includes a stator for generating a rotating magnetic field having a frequency or rotation proportional to the frequency of alternating current applied thereto by a power source, and a rotor connected to the pump spindle which is reactive to the rotating magnetic field by applying sufficient torque to the spindle to rotate the same axially. In accordance with the invention, the pump also includes means to sense the frequency of rotation of the spindle; means defining a selected slip frequency; and means responsive to the frequency of rotation of the spindle and to selected slip frequency by generating a frequency correction signal to be applied to the power source to control frequency of the current applied to the stator.

BRIEF DESCRIPTION OF THE DRAWINGS

With reference to the accompanying single sheet of drawing:

FIG. 2 is an electrical block diagram of aspects of the drive system of the pump.

DETAILED DESCRIPTION OF THE PREFERRED EMBODIMENT

Figure 1:
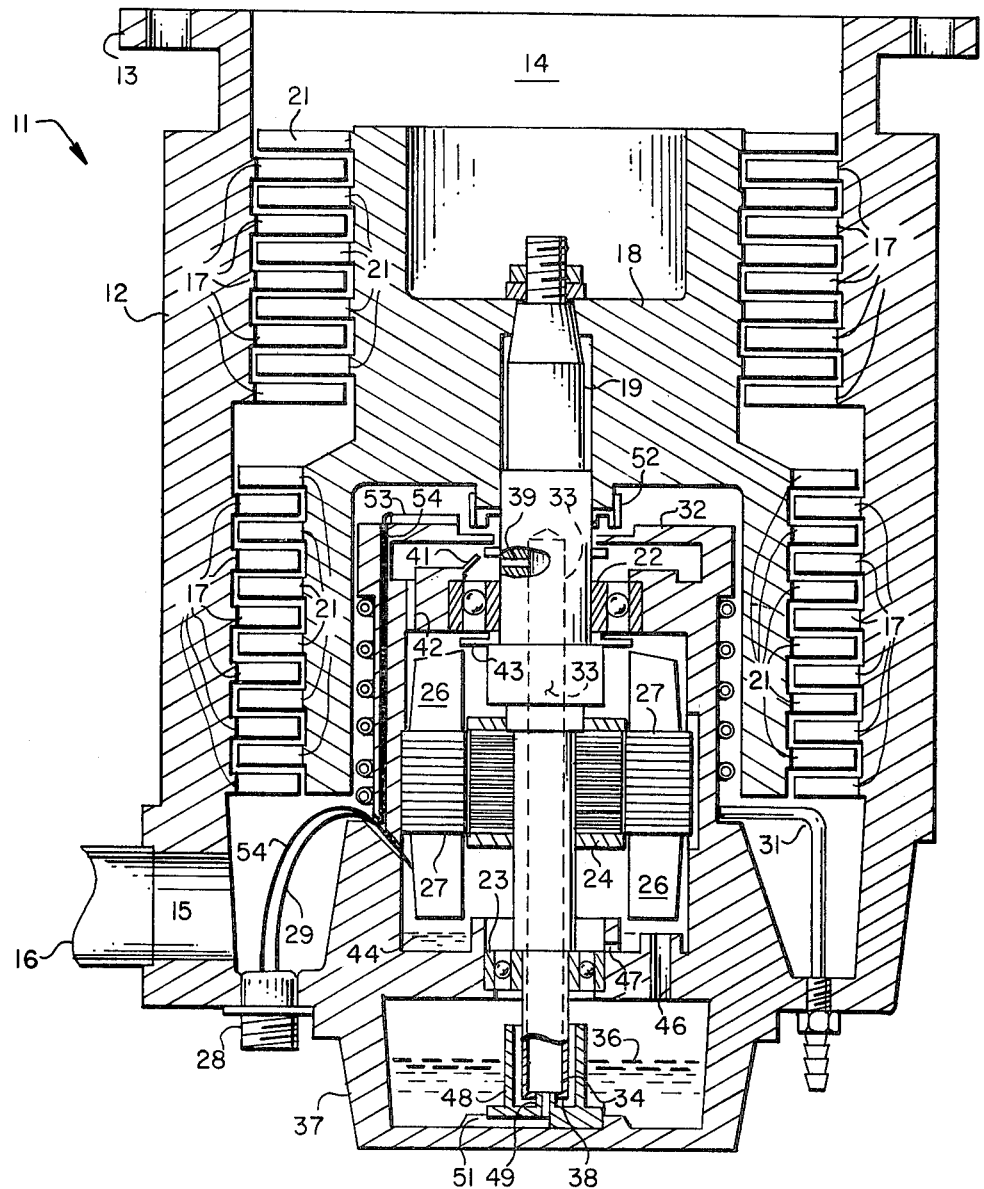
FIG. 1 is a somewhat schematic, sectional view of a turbomolecular pump of the invention incorporating the drive system.

With reference to FIG. 1, a turbomolecular pump 11 incorporating the invention is illustrated schematically. It includes an outer tubular casing 12 having a high vacuum flange 13 circumscribing its upper end for hermetic connection about an opening into a vacuum chamber or other isolated environment to be pumped. The open end 14 of the casing thus acts as an inlet opening for the pump. An exhaust opening 15 is shown adjacent the lower end of the casing 12 connected to a vacuum pipe 16 leading to, for example, a mechanical roughing pump.

In accordance with conventional turbomolecular pump design, a plurality of spaced stator blade wheels 17 disposed between the inlet and exhaust openings project circumferentially inward from the inner wall of the casing 12. While such blade wheels are schematically illustrated as being integral with the casing wall, it will be appreciated that in most turbomolecular pumps they are provided as separate parts which are spaced from one another by, for example, spacer rings.

The pump 11 further includes a rotor 18 mounted on a spindle 19 for rotation on a generally vertical axis. Rotor 18 has a plurality of axially spaced rotor blade wheels 21 interleaved with the stator blade wheels 17. The shaft is journalled for rotation on a pair of spaced ball bearings 22 and 23.

As mentioned previously, upon high speed rotation of the rotor, e.g., 10,000–50,000 r.p.m., the rotor blade wheels and the stator blade wheels will cause high vacuum pumping in the free molecular pressure range. In this connection, the design of the blades of the stator and rotor wheels can be optimized for a desired pumping speed or pressure ratio (or compromise between the two) in accordance with the design criteria set forth in the paper entitled "Vacuum Pumping with a Bladed Axial-Flow Turbomachine" by Kruger et al., appearing in the *Seventh National Symposium of Vacuum Technology Transactions* of the American Vacuum Society, Inc., Pergamon Press (1961).

The drive means for rotating the spindle and, hence, the pump rotor at the high rate of revolution requires is an electrical induction motor incorporated directly into the pump. Such induction motor comprises a squirrel cage rotor 24 pressfit or otherwise rigidly secured to the spindle 19 at a location between the bearings 22 and 23, and a stator made up of poles 27 and windings 26 spaced outwardly of the rotor circumferentially surrounding the same.

As previously mentioned, the stator of an induction motor generates a rotating magnetic field having a frequency of rotation proportional to the frequency of alternating current which is applied thereto by a power source. The rotor 24 connected to the spindle 19 is reactive to such rotating magnetic field by applying sufficient torque to the spindle to rotate the same about its axis. As will be discussed in more detail hereinafter, the pump of the invention includes a drive system for the motor which minimizes the amount of heat which will be generated thereby due to slip between the rotating magnetic field and the frequency of rotation of the motor rotor.

Electrical power is fed to the stator windings via an electrical socket 28 connected to the same by conductor 29. Coolant flow coils 31 are wrapped around the housing 32 which supports the motor stator in order to dissipate heat generated thereby. Such housing is secured to the pump casing 12 to be maintained stationary.

The lubrication system for the bearings 22 and 23 includes an axial passageway 33 which extends upwardly through spindle 19 from its lower end 34 to a position above the upper bearing 22. Its lower end 34 extends below the surface of a lubricant fluid (represented at 36) within a reservoir 37 provided at the bottom of the pump housing 12.

Passageway 33 is designed to cause fluid lubricant entering its lower end 34 to travel upwardly therealong upon high speed rotation of the spindle. That is, the lower end of the spindle includes an inwardly extending flange 38 defining a circumferential shoulder at such lower end providing support adjacent the walls of the passageway for any fluid lubricant therein. Upon rotation of the spindle at the high revolutions which are required for efficient turbomolecular pumping, fluid continuously fed into the passageway 33 by the head of fluid pressure within reservoir 37 will be forced by centrifugal action against the wall of the tube and tend to climb the same as additional fluid is introduced into such tube.

Passageway 33 has an outlet positioned to direct lubricant to the bearing 22. More particularly, one or more outlet bores 39 extend radially outward from the passageway 33 at a location above the bearing 22. Upon rotation of the spindle, lubricant at the bore 39 will be ejected from the spindle passageway. Such lubricant exiting the shaft will form, in effect, an annular disc of lubricant above the bearing 22. A tang 41 extends upwardly from the wall of the housing 32 to intercept a portion of the lubricant in such annular disc and direct the same toward the bearing 22. The lubricant will thus seep continuously downward to the outer ring of ball bearing 22 and into its race to provide lubrication of the same. Vertical passageways, such as the passageway 42, are provided to permit lubricant not intercepted by the tang 41 to bypass the bearing 22 and flow downwardly into the spaces surrounding the stator of the drive motor.

Means are provided to assure that lubricant flowing into the motor space does not cause undesirable drag and power losses. More particularly, an annular shield 43 is provided circumscribing the spindle and projecting radially outward from the same at a location between the bearing 22 and the motor. The purpose of such shield is to intercept lubricant flowing downward from the bearing and divert the same from the motor rotor. In this connection, it should be noted that it extends radially outward a greater distance from the spindle than the air gap between the rotor and stator to thereby prevent lubricant from entering the same, even at low speeds of rotation of the rotor.

Passages are provided as is conventional for allowing downward flow by gravity of the lubricant past the motor. Means are included for intercepting the downward flow of such lubricant prior to the same reaching the reservoir and directing the same to the bearing 23 for lubrication thereof. That is, the lower portion of the housing structure 32 for the motor defines a cavity 44 within which the lubricant is captured. Such lubricant rises to the level of the inlet of a spillway outlet 46 which returns excess lubricant to the reservoir 37. A metering orifice 47 extends from the cavity 44 to a location immediately above the bearing 23 for directing lubricant within such cavity to such bearing for continuously lubricating the same. Lubricant exiting the bearing is allowed to flow into reservoir 37.

The lubrication arrangement of the pump includes a nozzle communicating with the reservoir 37 which extends into the inlet orifice at the lower end of the passageway to feed fluid lubricant thereinto without such lubricant having to contact external rotating surfaces of the spindle. Moreover, means are included isolating the exterior of the spindle adjacent its lower end from lubricant within the reservoir during spindle rotation. More particularly, a cylindrically shaped cup 48 surrounds the lower end of the spindle in space relationship thereto and extends to a level above the normal surface level 36 of the fluid lubricant within the reservoir. Extending upward from the bottom of the cup into the inlet orifice of the passageway is a tube 49 providing, in effect, the aforesaid nozzle.

As illustrated, tube 49 communicates through a passage 51 beneath the cup with the reservoir 37 adjacent its bottom, i.e., below the normal surface level of lubricant therein. This arrangement provides communication of the passageway within the spindle with lubricant under the pressure head developed within the reservoir without such lubricant having to contact the rotating spindle prior to the same entering into the passageway. In this connection, it is to be noted that the outer wall of the tube 49 is spaced radially inwardly slightly from the inner peripheral edge of the flange 38 so that it does not interfere with free rotation of the spindle.

Cup 48 extends upwardly to a level above the normal surface level 36 of fluid lubricant within the reservoir. The only communication which the interior of such cup has with lubricant is through passageway 51 and tube 49, and then through the slight space between the tube 49 and the rotating flange 38 of the spindle. Because of such construction, the cup provides essentially complete isolation of the rotating spindle from the lubricant during its rotation. That is, although while the cup will normally fill with lubricant to the level 36 while the spindle is stationary, rotation of such spindle at high speed will cause sufficient turbulence and velocity of lubricant within the cup to cause ejection of the same so that during continued rotation the lower end of the spindle will not be subject to viscous drag and consequent power losses.

As previously mentioned, in view of electrical inefficiencies significant heat is typically generated within turbomolecular pumps now available utilizing induction type motors. Heat generated in the motor rotor cannot easily be dissipated in a reliable manner because of the speed with which the rotor rotates and the vacuum environment. In accordance with the invention, a drive system is included which significantly reduces the amount of heat which would normally be generated within a turbomolecular pump by an induction motor rotor. It includes means for sensing the frequency of rotation of the rotor spindle 19, and hence, the frequency of rotation of the motor rotor. As best illustrated in FIG. 2, such means includes a tooth wheel 52 which circumscribes the spindle 19 and is secured to the pump rotor for rotation therewith. The teeth on such wheel cooperate with a light emitting diode/phototransister combination, or other photosensor 53, to form a transducer which generates a digital signal proportional to the frequency of rotation of the rotor. Such signal is fed via conductor 54 through the socket 28 to a control circuit 56.

The pump drive further includes means defining a selected slip frequency which is also fed to control circuit 56. That is, a slip frequency oscillator 57 is provided for generating a signal defining a desired slip frequency. Most desirably, a constant slip frequency is selected and fed to the control circuit 56 whenever the pump is in an accelerating or steady state condition. As an alternative, the slip frequency generated by oscillator 57 could be programmed to be different under various operating conditions of the pump. Input line 58 is included in the schematic to represent such a programming or, for example, a dial or other manually actuatable arrangement for changing the frequency of the oscillator output.

Control circuit 56 utilizes both the slip frequency signal generated by oscillator 57 and the digital signal which is proportional to the frequency of rotation of the rotor, to correct the frequency of alternating current applied to the motor stator by its power source, represented in the drawing as power converter 59. More specifically, control circuit 56 combines the slip frequency with the frequency of rotation of the motor rotor to direct the power converter, as represented by line 61, to feed to the windings 26 of the stator an alternating current at a frequency which is proportional to the sum of the slip frequency and the actual frequency of rotation of the rotor. Also, the control circuit assures that the voltage and current magnitudes applied to the stator are controlled to produce a controlled motor torque. During rotor acceleration, the applied current is approximately constant and limited to a magnitude within the circuit capabilities. When the desired pump rotational speed is attained, the voltage and current are reduced so that motor torque is just sufficient to overcome frictional losses and provide generally constant frequency of rotation.

While various control circuits may be utilized for the above purposes, the best mode contemplated by the inventor for carrying out the invention is the power control described in copending patent application Ser. No. 636,195 filed by Robert C. Franklin for "Power Control for Variable Speed Induction Motors", (now U.S. Pat. No. 4,042,862) the subject matter of which is hereby incorporated herein by reference. Such power control is not only capable of generating a constant slip frequency with the power converter described therein, it also has the ability to rapidly re-establish a desired slip frequency after momentary power outages and is sensitive to the polarity of the slip frequency with respect to the spindle frequency so as to cause an automatic shutdown in the event of improper polarity.

A visible read-out 62, such as a light emitting diode display or a meter, is also provided to enable an operator of the pump to readily determine the pump rotor speed at any given time.

To the extent described to this point, the drive system of the invention is capable of providing a controlled slip frequency to the pump motor during both acceleration and steady state operation of the pump. It is also capable of providing pump rotor deceleration when desired. That is, an acceleration/braking control 63 which can be in the form of a manually operable switch or the like as described in the aforesaid copending patent application, can be provided to cause the control circuit 56 to subtract the slip frequency from the rotor frequency, rather than add the same. The resulting alternating current applied by the converter 59 to the stator will have a frequency value less than the frequency of rotation of the pump rotor. Rotational energy of the pump rotor is then converted to electrical energy and can be dissipated by resistance circuitry.

The drive system of the turbomolecular pump of the invention has advantages in addition to the advantage of reducing the temperature of operation of such pump. Maintaining a constant slip frequency will maintain high motor efficiency regardless of partial loading, i.e., regardless of whether the turbine rotor is accelerating or is in steady operation. Also, by selecting the proper combinations of motor characteristics and slip frequency, increased acceleration torque may be produced in the lower speed ranges. Beyond the point in speed where maximum available voltage is reached, the torque decreases with increasing speed so as to approximate constant horsepower output. The resulting beneficial affect is that for a given power output acceleration of the high inertia represented by the pump rotor from zero speed to a given operating speed will take less time.

Although the invention has been described in connection with a preferred embodiment thereof, it will be appreciated by those skilled in the art that various changes can be made without departing from the spirit of the same. It is therefore intended that the coverage afforded applicant be limited only by the spirit of the invention as encompassed by the claims and their equivalent language.

I claim:

1. A method of reducing the temperature of operation of a turbomolecular pump having an induction motor incorporated therein for rotating the pump rotor; which motor includes a stator for generating a rotating magnetic field having a frequency of rotation proportional to the frequency of alternating current applied thereto by a power source, and a rotor connected to said pump rotor reactive to said rotating magnetic field by applying sufficient torque to said pump rotator to rotate the same axially, comprising the steps of:

sensing the frequency of rotation of the induction rotor of said motor;

providing a signal defining a slip frequency selected to be the difference between the frequency of rotation of said pump rotor and the frequency of rotation of said magnetic field; and utilizing the frequency of rotation of the induction rotor of said motor and said slip frequency defining signal to generate a frequency correction signal for application to said power source to control the frequency of alternating current applied thereby to said motor stator.

2. A method according to claim 1 of reducing the temperature of operation of a turbomolecular pump wherein said step of providing a slip frequency defining signal comprises providing such a signal which defines a selected constant frequency difference between the frequency of rotation of said spindle and the frequency of rotation of said magnetic field.

3. A method according to claim 1 of reducing the temperature of operation of a turbomolecular pump wherein said step of utilizing said frequency of rotation of the induction rotor of said motor and said slip frequency defining signal to generate a frequency correction signal comprises utilizing the same to generate a frequency correction signal to be applied to said power source to increase the frequency of alternating current applied thereby to said stator to a value greater than the frequency of rotation of said induction rotor.

4. A method of reducing the temperature of operation of a turbomolecular pump according to claim 1 wherein each step of utilizing said frequency of rotation of the induction rotor of said motor and said slip frequency defining signal to generate a frequency correction signal comprises utilizing the same to generate a frequency correction signal to be applied to said power source to decrease the frequency of alternating current applied thereby to said stator to a value less than the frequency of rotation of said induction rotor.

5. A method of reducing the temperature of operation of a turbomolecular pump according to claim 1 wherein said step of utilizing the frequency of rotation of the induction rotor of said motor and said slip frequency defining signal comprises utilizing the same to generate a frequency correction signal for application to said power source to control the frequency of alternating current applied thereby to said motor stator to be proportional to the algebraic sum of said frequency of rotation and said slip frequency.

6. A method of reducing the temperature of operation of a turbomolecular pump according to claim 1 further including the step of reducing the voltage and current applied to said stator upon said pump rotor reaching a selected rotational speed to provide a motor torque resulting in a generally constant frequency of rotation of said pump rotor.

7. A high vacuum turbomolecular pump comprising an outer casing having an inlet opening adapted to be communicated hermetically with an isolated environment to be pumped and an exhaust opening spaced from said inlet opening; a plurality of stator blade wheels positioned within said casing intermediate said inlet and exhaust openings; a rotor within said casing mounted on a spindle for rotation therewith, said rotor having a plurality of axially spaced rotor blade wheels interleaved with said stator blade wheels for high vacuum pumping upon rotation of said rotor; an electrical induction motor incorporated into said pump for rotating said spindle and rotor, said motor including a stator for generating a rotating magnetic field having a frequency of rotation proportional to the frequency of alternating current applied thereto by a power source and a rotor connected to said spindle reactive to said rotating magnetic field by applying sufficient torque to said spindle to rotate the same axially; means to sense the frequency of rotation of said spindle; means defining a slip frequency selected to be the difference between the frequency of rotation of said spindle and the frequency of rotation of said magnetic field; and means responsive to the frequency of rotation of said spindle and said selected differential slip frequency by generating a frequency correction signal to be applied to said power source to control the frequency of alternating current applied thereby to said stator.

8. A high vacuum turbomolecular pump according to claim 7 wherein said means defining a slip frequency defines a selected constant frequency difference between the frequency of rotation of said spindle and the frequency of rotation of said magnetic field.

9. A high vacuum turbomolecular pump according to claim 7 wherein said means responsive to the frequency of rotation of said spindle and said selected differential frequency responds thereto by generating a frequency correction signal to be applied to said power source to increase the frequency of alternating current applied thereby to said stator to a value greater than the frequency of rotation of said pump rotor.

10. A high vacuum turbomolecular pump according to claim 7 wherein said means responsive to the frequency of rotation of said spindle and said selected differential frequency responds thereto by generating a frequency correction signal to be applied to said power source to decrease the frequency of alternating current applied thereby to said stator to a value less than the frequency of rotation of said pump rotor.

11. A high vacuum turbomolecular pump according to claim 7 wherein said spindle is supported for said rotation by a bearing spaced from one end of said spindle; and further including a fluid lubricant passageway within said spindle extending along the rotational axis thereof from an inlet orifice at said one end to a position adjacent said bearing, said passageway being adapted to draw fluid lubricant therealong by centrifugal action upon rotation of said spindle and having an outlet positioned to direct lubricant to said bearing, a reservoir of a fluid lubricant for said bearing, and a nozzle communicating with said reservoir and extending into said inlet orifice to feed fluid lubricant into said passageway without such lubricant having to contact external rotating surfaces of said bearing.

12. A high vacuum turbomolecular pump according to claim 11 wherein said reservoir surrounds said one end of said spindle and means are included isolating the exterior of said spindle adjacent said one end from lubricant within said reservoir during rotation of said spindle, whereby rotation of said spindle does not cause turbulence of appreciable lubricant at said one end of said spindle.

* * * * *